United States Patent
Tsai

(10) Patent No.: US 11,932,378 B2
(45) Date of Patent: Mar. 19, 2024

(54) ACTUATED ASSEMBLIES, KITS, AIRCRAFT, AND METHODS OF UTILIZING THE SAME

(71) Applicant: The Boeing Company, Chicago, IL (US)

(72) Inventor: Kevin Raylin Tsai, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/668,140

(22) Filed: Feb. 9, 2022

(65) Prior Publication Data

US 2023/0249804 A1  Aug. 10, 2023

(51) Int. Cl.
*B64C 13/34* (2006.01)
*B64C 9/02* (2006.01)

(52) U.S. Cl.
CPC .............. *B64C 13/34* (2013.01); *B64C 9/02* (2013.01)

(58) Field of Classification Search
CPC .................................. B64C 13/34; B64C 9/02
See application file for complete search history.

(56) References Cited

U.S. PATENT DOCUMENTS

| | | | |
|---|---|---|---|
| 2011/0038576 A1* | 2/2011 | Thornton | F16C 23/043 384/476 |
| 2017/0305533 A1* | 10/2017 | Viennot | F16H 1/46 |
| 2019/0226530 A1* | 7/2019 | Meyer | B64C 9/16 |
| 2020/0039631 A1* | 2/2020 | Elenbaas | B64C 3/56 |
| 2021/0009255 A1* | 1/2021 | Gruner | B64C 9/00 |
| 2021/0061442 A1* | 3/2021 | Tsai | B64C 9/02 |
| 2021/0114714 A1 | 4/2021 | Tsai et al. | |
| 2022/0340264 A1* | 10/2022 | Umetsu | B64C 13/50 |

OTHER PUBLICATIONS

U.S. Appl. No. 17/657,859 to Umetsu et al., filed Apr. 4, 2022.

* cited by examiner

*Primary Examiner* — Rodney A Bonnette

(74) *Attorney, Agent, or Firm* — Kolitch Romano Dascenzo Gates LLC

(57) ABSTRACT

Actuated assemblies comprise a base object, an actuated object, a rotary actuator, and a joint. The rotary actuator is configured to selectively pivot the actuated object relative to the base object. The rotary actuator comprises a housing that is operatively coupled to the base object, and an output gear that is configured to be selectively rotated relative to the housing. The joint comprises a crowned spline and a joint spherical bearing. The crowned spline is meshed with the output gear of the rotary actuator and is fixed relative to the actuated object. The joint spherical bearing comprises an outer race that is fixed relative to the base object, and an inner race that is positioned for rotational and pivotal movement within the outer race and that is fixed relative to the crowned spline.

26 Claims, 6 Drawing Sheets

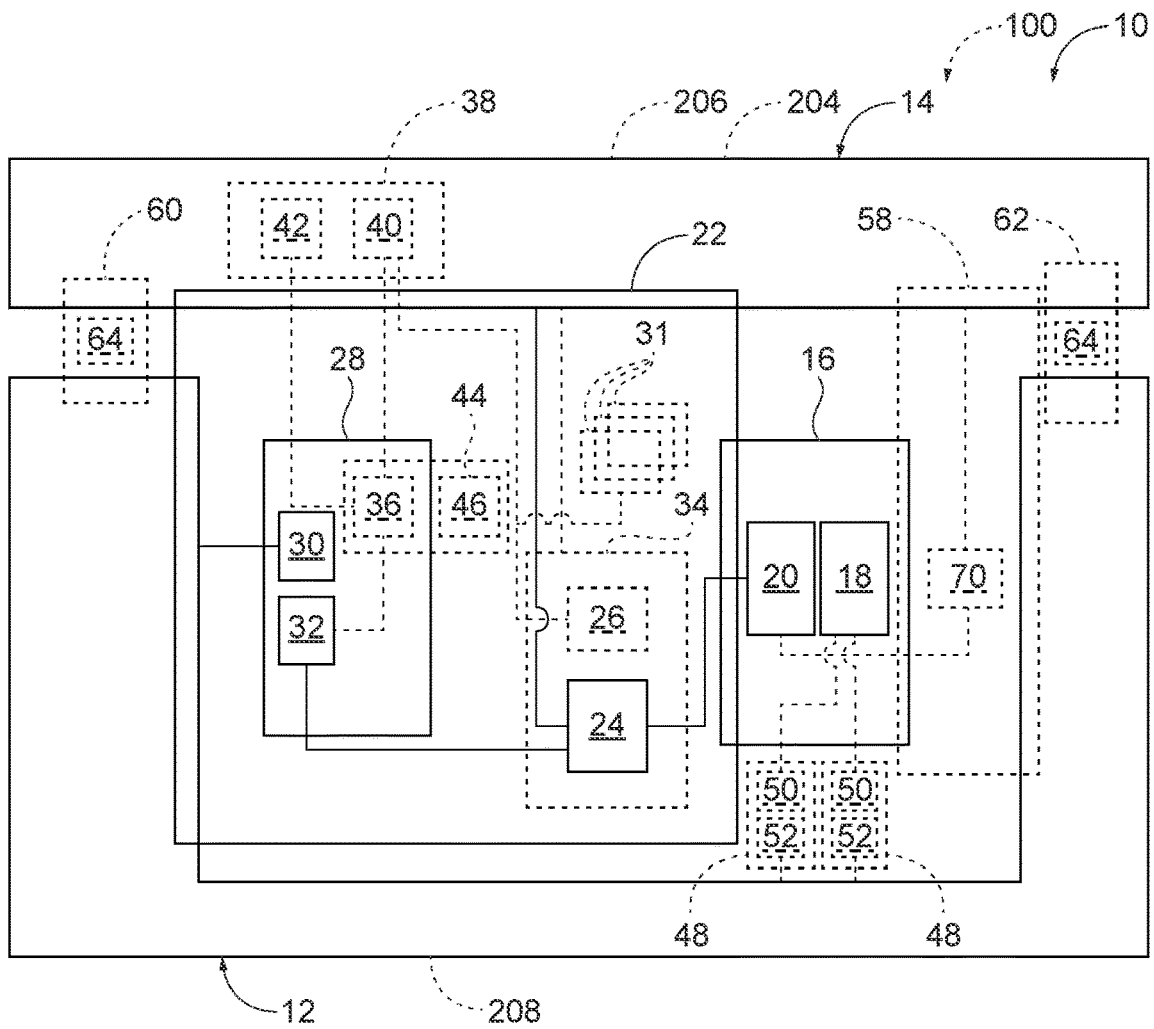

| REFERENCE NUMBER | PART NAME |
|---|---|
| 10 | ACTUATED ASSEMBLIES |
| 100 | ACTUATED ASSEMBLY KITS |
| 12 | BASE OBJECT |
| 14 | ACTUATED OBJECT |
| 16 | ROTARY ACTUATOR |
| 18 | HOUSING |
| 20 | OUTPUT GEAR |
| 22 | JOINT |
| 24 | CROWNED SPLINE |
| 26 | FLANGE |
| 28 | SPHERICAL BEARING |
| 30 | OUTER RACE |
| 31 | FASTENERS |
| 32 | INNER RACE |
| 34 | OUTPUT SHAFT |
| 36 | AXLE |

| REFERENCE NUMBER | PART NAME |
|---|---|
| 38 | YOKE STRUCTURE |
| 40 | INNER LEG |
| 42 | OUTER LEG |
| 44 | FASTENER SET |
| 46 | FASTENING ELEMENTS |
| 48 | COUPLER ARMS |
| 50 | FIRST COUPLER-ARM SPHERICAL BEARING |
| 52 | SECOND COUPLER-ARM SPHERICAL BEARING |
| 58 | SECOND JOINT |
| 60 | THIRD JOINT |
| 62 | FOURTH JOINT |
| 64 | LINK ARM |
| 70 | SECOND OUTPUT SHAFT |
| 204 | FLIGHT CONTROL SURFACE |
| 206 | SPOILERS |
| 208 | WING BOX |

FIG. 2

ACTUATED ASSEMBLIES, KITS, AIRCRAFT, AND METHODS OF UTILIZING THE SAME

FIELD

The present disclosure relates to actuated assemblies, kits for assembling actuated assemblies, aircraft, flight control surfaces, and associated methods.

BACKGROUND

In flight, aircraft wings bend, which in turn may impart undesirable stresses and strains on structures within the wings, such as actuators for flight control surfaces. Traditionally, linear actuators are utilized to actuate many types of flight control surfaces. In some instances, such as in connection with spoilers, a linear actuator may extend forward of the spoiler a significant distance, thereby taking up volume within the wing box that otherwise could be utilized for fuel storage, for example.

SUMMARY

Actuated assemblies, kits for assembling actuated assemblies, aircraft, and methods of utilizing actuated assemblies are disclosed.

Actuated assemblies comprise a base object, an actuated object, a rotary actuator, and a joint. The rotary actuator is configured to selectively pivot the actuated object relative to the base object. The rotary actuator comprises a housing that is operatively coupled to the base object, and an output gear that is configured to be selectively rotated relative to the housing. The joint comprises a crowned spline and a joint spherical bearing. The crowned spline is meshed with the output gear of the rotary actuator and is fixed relative to the actuated object. The joint spherical bearing comprises an outer race that is fixed relative to the base object, and an inner race that is positioned for rotational and pivotal movement within the outer race and that is fixed relative to the crowned spline.

Aircraft comprise a fuselage, and a wing that is supported by the fuselage. The wing comprises an actuated assembly according to the present disclosure.

Methods utilizing an actuated assembly according to the present disclosure comprise rotating the output gear about the output axis of rotation, and simultaneously with the rotating, receiving a force that causes the base object and the actuated object to bend in a direction that is transverse to the longitudinal axis of the housing of the rotary actuator. The longitudinal axis of the housing of the rotary actuator remains straight during the bending.

BRIEF DESCRIPTION OF THE DRAWINGS

FIG. 2 is schematic diagram representing actuated assemblies according to the present disclosure.

DESCRIPTION

Actuated assemblies 10, kits 100 for assembling actuated assemblies 10, and aircraft 200 are disclosed herein.

Figure 1:
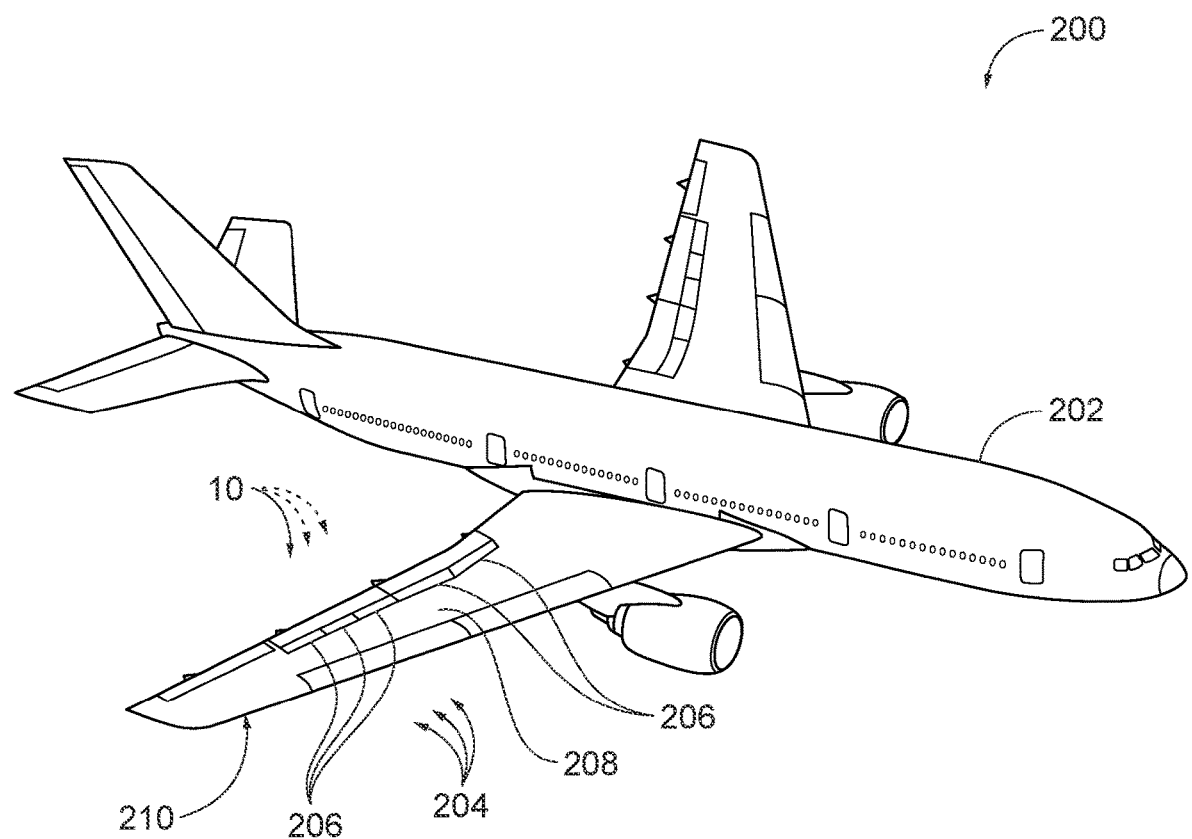
FIG. 1 is an illustration of an example aircraft comprising at least one actuated assembly according to the present disclosure.

FIG. 1 illustrates an example aircraft 200 that comprises at least one actuated assembly 10 according to the present disclosure. More specifically, aircraft 200 comprises a fuselage 202 and a wing 210 that is supported by the fuselage 202. The wing 210 comprises a wing box 208, a plurality of flight control surfaces 204, including spoilers 206, and at least one actuated assembly 10 according to the present disclosure that is associated with one or more of the flight control surfaces 204. For example, an actuated assembly 10 may be configured to operatively pivot a spoiler 206. That said, actuated assemblies 10 according to the present disclosure are not required to be used exclusively with spoilers 206 and may be configured for operation of various other types or configurations of flight control surfaces 204 or even other aircraft components or non-aircraft components.

FIG. 2 schematically represents actuated assemblies 10 according to the present disclosure. Generally, in FIG. 2, elements that are likely to be included in a given example of an actuated assembly 10 are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

As schematically represented in FIG. 2 in solid boxes, actuated assemblies 10 typically comprise at least a base object 12, an actuated object 14, a rotary actuator 16, and a joint 22. The rotary actuator 16 is configured to selectively pivot the actuated object 14 relative to the base object 12. For example, the actuated object 14 may be a flight control surface 204, such as a spoiler 206, and the base object 12 may be a wing box 208 or component thereof, such as a rib, a spar, a skin, or other structural component of a wing box 208. The rotary actuator 16 comprises a housing 18 that is operatively coupled to the base object 12, and an output gear 20 that is configured to be selectively rotated relative to the housing 18. In some examples, the housing 18 of the rotary actuator 16 may be described as having, or defining, a longitudinal axis that is parallel to an output axis of rotation of the output gear 20. Rotary actuators 16 may take any suitable form and, for example, may hydraulically, pneumatically, and/or electrically actuate and rotate the output gear 20.

In FIG. 2, the joint 22 is represented in an overlapping relationship with the base object 12, the actuated object 14, and the rotary actuator 16, schematically representing that the joint 22 may be defined in part by, or may include components of, one or more of the base object 12, the actuated object 14, and the rotary actuator 16, as well as one or more components that are distinct from the base object 12, the actuated object 14, and the rotary actuator 16. At a minimum, the joint 22 comprises a crowned spline 24 and a joint spherical bearing 28.

The crowned spline 24 is meshed with the output gear 20 of the rotary actuator 16 and is fixed relative to the actuated object 14. Accordingly, rotation of the output gear 20 by the rotary actuator 16 causes the crowned spline 24 to rotate, which in turn causes the actuated object 14 to pivot relative to the base object 12. The output gear 20 may be an external gear, such as a spur gear, that is meshed with the crowned spline 24. In some such examples, the output gear 20 may comprise a planetary gear set. In other examples, the output gear 20 may be an internal gear that is meshed with the crowned spline 24. Various gear configurations are within the scope of the present disclosure.

The meshing of the crowned spline 24 with the output gear 20 permits the rotary actuator 16, and in particular the output gear 20 thereof, to be off-axis with the crowned spline 24. That is, the output gear 20, as a result of the housing 18 being coupled to the base object 12, may pivot transverse to its axis of rotation, and thus relative to the crowned spline 24 (and vice versa), and still permit the operative transfer of rotational output from the output gear 20 to the crowned spline 24. Depending on the application, the permitted relative angle between the axis of rotation of the output gear 20 and the axis of rotation of the crowned spline 24 may vary and may be based on the structural configuration of the crowned spline 24. In some applications, the angle may need be no more than 0.1° or even less, while in other applications, the angle may need to be 5° or more and even as great as 10° or more. For example, the permitted angle may be a function of the stiffness and/or construction of the base object 12. In an aerospace application, wings of some aircraft undergo significantly more bending in flight than wings of other aircraft, for example.

The joint spherical bearing 28 comprises an outer race 30 that is fixed relative to the base object 12, and an inner race 32 that is positioned for rotational and pivotal movement within the outer race 30 and that is fixed relative to the crowned spline 24. Because the inner race 32 is fixed relative to the crowned spline 24, and thus also is fixed relative to the actuated object 14, the joint spherical bearing 28 permits pivoting and rotation of the actuated object 14 relative to the output gear 20, the housing 18, and the base object 12.

Inclusion of the crowed spline 24 and the joint spherical bearing 28 permits the base object 12 and/or the actuated object 14 to be deformed (e.g., undergo a bending force), without the deformation being imparted to the rotary actuator 16. Accordingly, the integrity of the rotary actuator 16 is maintained despite the base object 12 and/or the actuated object 14 being bent as a result of an external force (e.g., the bending of an aircraft wing 210 due to aerodynamic lift and the weight of the aircraft's fuselage 202).

With continued reference to FIG. 2, in some examples, the joint 22 further comprises an output shaft 34 that comprises the crowned spline 24. The output shaft 34 is fixed to the actuated object 14. In some such examples, the joint 22 further comprises an axle 36 that is fixed to the inner race 32 of the joint spherical bearing 28, and the actuated object 14 comprises a yoke structure 38. The yoke structure 38 comprises an inner leg 40 that is fixedly coupled to the output shaft 34 and to the axle 36, and an outer leg 42 that is fixedly coupled to the axle 36. The joint spherical bearing 28 is positioned between the inner leg 40 and the outer leg 42 of the yoke structure 38. In other words, the output shaft 34 (including the crowned spline 24), the axle 36, the inner race 32, and the yoke structure 38 are fixed relative to each other and thus are able to rotate and pivot relative to the outer race 30, which is fixed relative to the base object 12. That is, the joint spherical bearing 28 in effect defines a shear transfer joint between the base object 12 and the actuated object 14.

In such examples, the joint 22 further comprises a fastener set 44 comprising the axle 36 and one or more fastening elements 46 that fix the axle 36 to the inner leg 40 and the outer leg 42 of the yoke structure 38. For example, the axle 36 may be a bolt, lockbolt, or other shaft that extends through and is engaged with the inner race 32 of the joint spherical bearing 28, and the one or more fastening elements 46 may include one or more of a nut, a washer, a collar, a spacer, a pin, etc. In particular, the fastener set 44 may secure and fixedly couple the yoke structure 38 to the inner race 32 of the joint spherical bearing 28.

In some examples, the output shaft 34 comprises a flange 26 that is fastened to the inner leg 40 of the yoke structure 38. In particular, in some such examples, the joint 22 further comprises at least three fasteners 31 that fasten the flange 26 to the inner leg 40 of the yoke structure 38, with the fasteners 31 being spaced radially about the flange 26. Accordingly, the interface between the flange 26 and the inner leg 40 of the yoke structure 38 define a torsion transfer joint, in which the rotational output of the output shaft 34 is directly transferred to the actuated object 14.

With continued reference to FIG. 2, some actuated assemblies 10 further comprise a second joint 58 that comprises a second output shaft 70 that is operatively coupled to the output gear 20. When present, the second output shaft 70 extends from the housing 18 opposite the first output shaft 34 and is fixed to the actuated object 14. In other words, the rotary actuator 16 may have output shafts extending from opposing sides of the rotary actuator 16, with the two output shafts both being operatively coupled to the actuated object 14. In some examples, the second joint 58 may be configured similarly to the first joint 22 with a crowned spline and a spherical bearing. However, the second joint 58 also may be configured without a crowned spline and/or without a spherical bearing. In particular, in some examples, unlike the first joint 22, the second joint 58 may be configured such that the second output shaft 70 and at least the housing 18 of the rotary actuator 16 do not pivot relative to the region of the actuated object 14 to which the output shaft 70 is coupled. That is, as discussed, the base object 12 and/or the actuated object 14 may undergo a bending force and may be deformed, with the first joint 22 allowing such deformation without the deformation being imparted to the rotary actuator 16. However, the second joint 58 is not required to also allow for such relative movement between the rotary actuator 16 and the actuated object 14 in all examples of actuated assemblies 10, such as depending on the configuration of the crowned spline 24 and/or on the application of the actuated assembly 10 and the degree of movement of the rotational axes of the output gear 20 and the crowned spline 24 relative to each other.

Some actuated assemblies 10 comprise additional joints, which also may be referred to as auxiliary joints, between the base object 12 and the actuated object 14, such as depending on the application of the actuated assembly 10 and/or on the size, length, and/or weight of the actuated object 14. For example, some actuated assemblies 10 further comprise a third joint 60 that is positioned opposite the second joint 58 relative to the first joint 22 and that pivotally couples the actuated object 14 to the base object 12. Some actuated assemblies 10 further comprise a fourth joint 62 that is positioned opposite the first joint 22 relative to the second joint 58 and that pivotally couples the actuated object 14 to the base object 12. In some such examples, each of the third joint 60 and the fourth joint 62 comprises a link arm 64 that is coupled between the actuated object 14 and the base object 12.

With continued reference to FIG. 2, some actuated assemblies 10 further comprise one or more coupler arms 48 that are operatively coupled between the housing 18 of the rotary actuator 16 and the base object 12. These coupler arms 48 in effect ground the rotary actuator 16 to the base object 12 to react the rotational output of the rotary actuator 16. The coupler arms 48 additionally or alternatively may be referred to as, or may comprise, tie rods. In some examples, each coupler arm 48 comprises a first coupler-arm spherical bearing 50 that is coupled to the housing 18 of the rotary actuator 16, and a second coupler-arm spherical bearing 52 that is coupled to the base object 12. As a result, while grounded to the base object 12, the rotary actuator 16 is permitted to move relative to the base object 12 within the constraints of the first coupler-arm spherical bearing 50 and the second coupler-arm spherical bearing 52. In some examples, the coupler arms 48 are adjustable in length, such as including turn-buckles. As a result, installation of the rotary actuator 16 and the actuated object 14 relative to each other is facilitated. For example, in applications in which the actuated object is a spoiler 206 on an aircraft 200, the adjustability of the coupler arms 48 permits for aerodynamic fairing of the spoiler 206. That is, the angle of the spoiler 206 relative to the adjacent portions of the wing 210, including an associated flap, is easily adjusted during installing of the spoiler 206.

With continued reference to FIG. 2, also within the scope of the present disclosure are kits 100 for assembling actuated assemblies 10. For example, a kit 100 may include two or more components of an actuated assembly 10.

Turning now to FIGS. 3-7, an illustrative non-exclusive example of an actuated assembly 10 in the form of actuated assembly 400 is illustrated. Where appropriate, the reference numerals from the schematic illustration of FIG. 2 are used to designate corresponding parts of actuated assembly 400; however, the example of FIGS. 3-7 is non-exclusive and does not limit actuated assemblies 10 to the illustrated embodiment of actuated assembly 400. That is, actuated assemblies 10 are not limited to the specific embodiment of the illustrated actuated assembly 400, and actuated assemblies 10 may incorporate any number of the various aspects, configurations, characteristics, properties, etc. of actuated assemblies 10 that are illustrated in and discussed with reference to the schematic representations of FIG. 2 and/or the embodiment of FIGS. 3-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to actuated assembly 400; however, it is within the scope of the present disclosure that the previously discussed features, variants, etc. may be utilized with actuated assembly 400.

Figure 3:
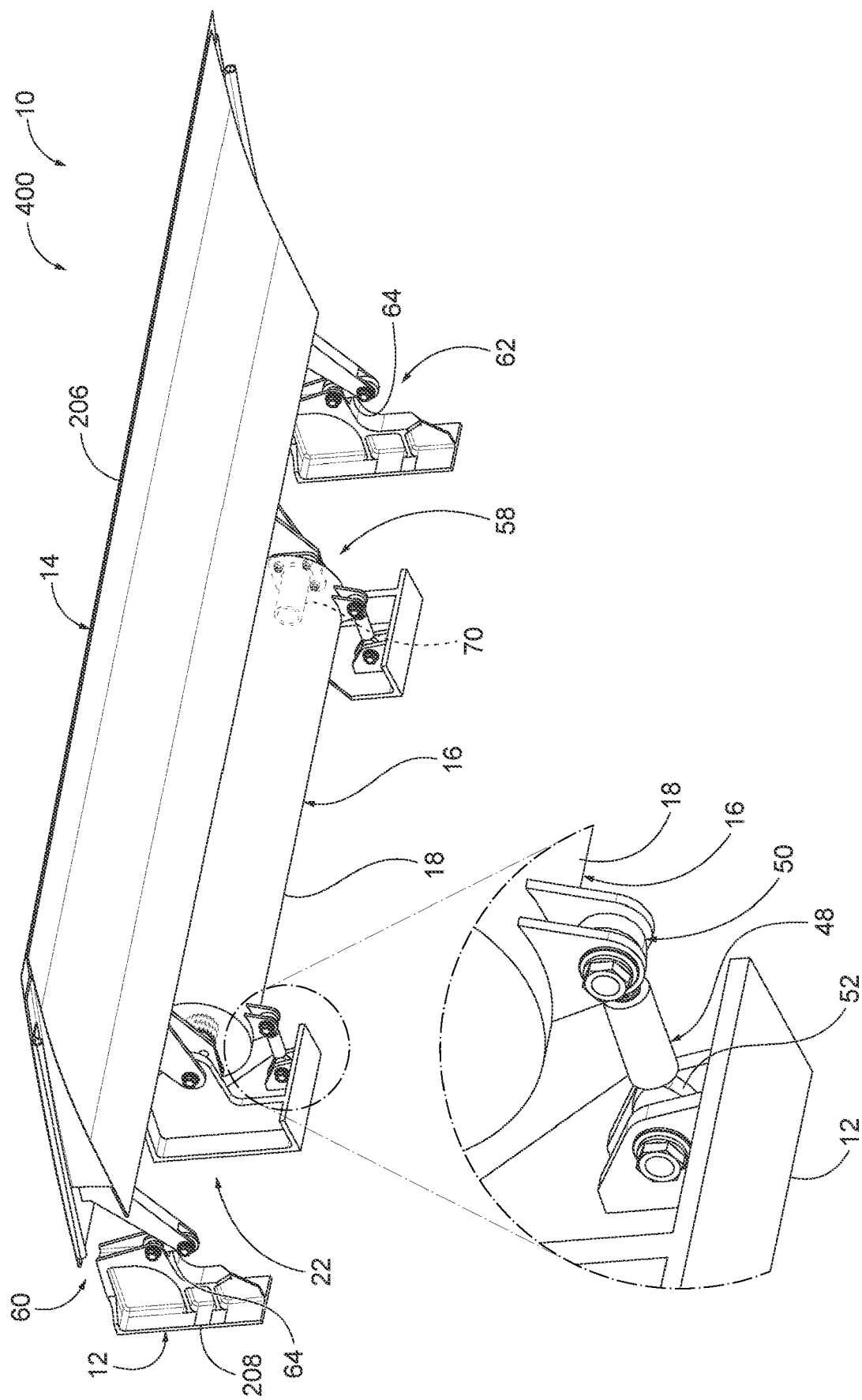
FIG. 3 is a detailed view of an example actuated assembly according to the present disclosure.

As perhaps best understood with reference to FIG. 3, actuated assembly 400 is an example of an actuated assembly 10 in which the actuated object 14 is a spoiler 206 and the base object 12 is a wing box 208 of an aircraft 200. As also seen in FIG. 3, actuated assembly 400 comprises a first joint 22, a second joint 58, and third joint 60, and a fourth joint 62. The third joint 60 and the fourth joint 62 each comprise a link arm 64 that is operatively coupled between the wing box 208 and the spoiler 206. As seen in the enlarged detail of FIG. 3, actuated assembly 400 further comprises a pair of coupler arms 48 that are operatively coupled between the housing 18 of the rotary actuator 16 and the wing box 208.

Figure 4:
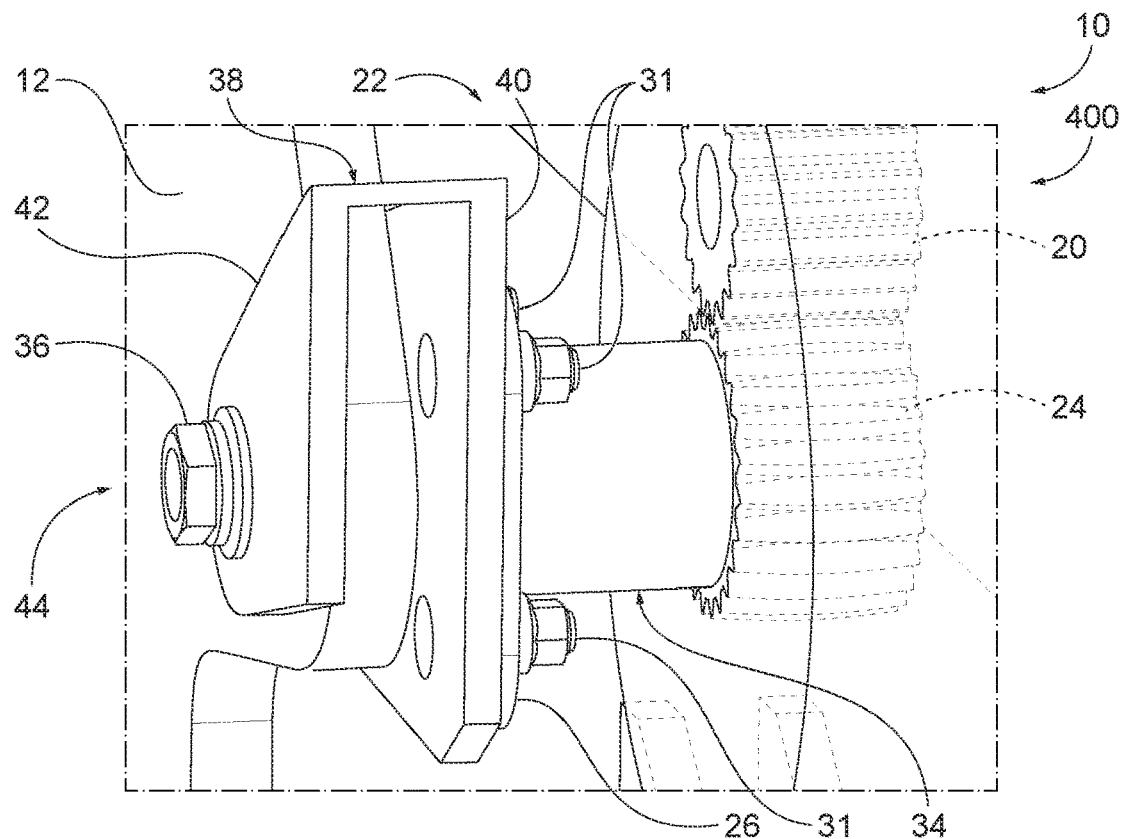
FIG. 4 is a detailed view of a portion of the actuated assembly of FIG. 3.
Figure 5:
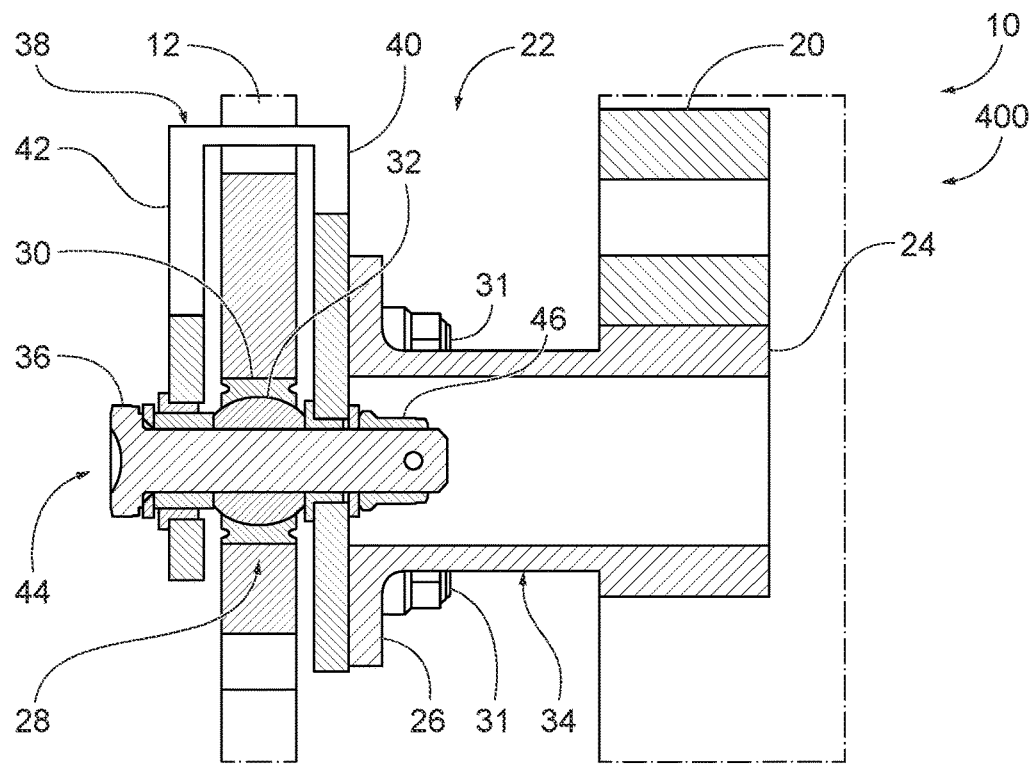
FIG. 5 is a cross-section view of the portion of the actuated assembly of FIG. 4.

As perhaps best seen with reference to FIGS. 4 and 5, actuated assembly 400 is an example of an actuated assembly 10 that comprises an output shaft 34 whose flange 26 is fastened to the inner leg 40 of a yoke structure 38 via a set of four fasteners 31. As perhaps best seen in FIG. 5, the first joint 22 of actuated assembly 400 comprises a joint spherical bearing 28, whose inner race 32 is operatively coupled to the yoke structure 38 via a fastener set 44.

Figure 6:
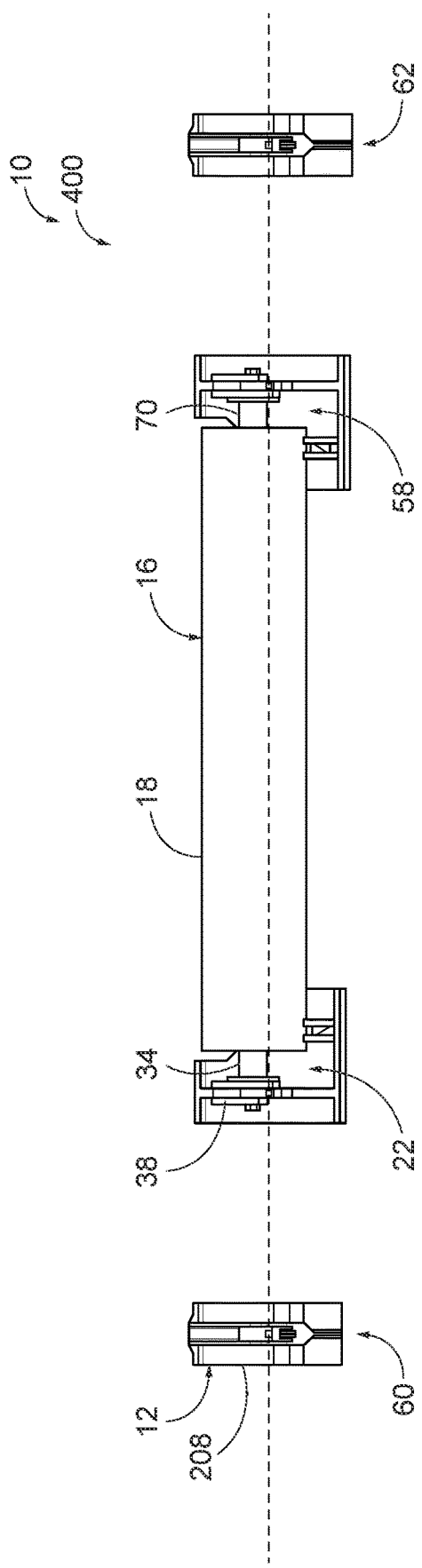
FIG. 6 is a rear view of the actuated assembly of FIG. 3 without the spoiler and showing the wing box in a neutral position.
Figure 7:
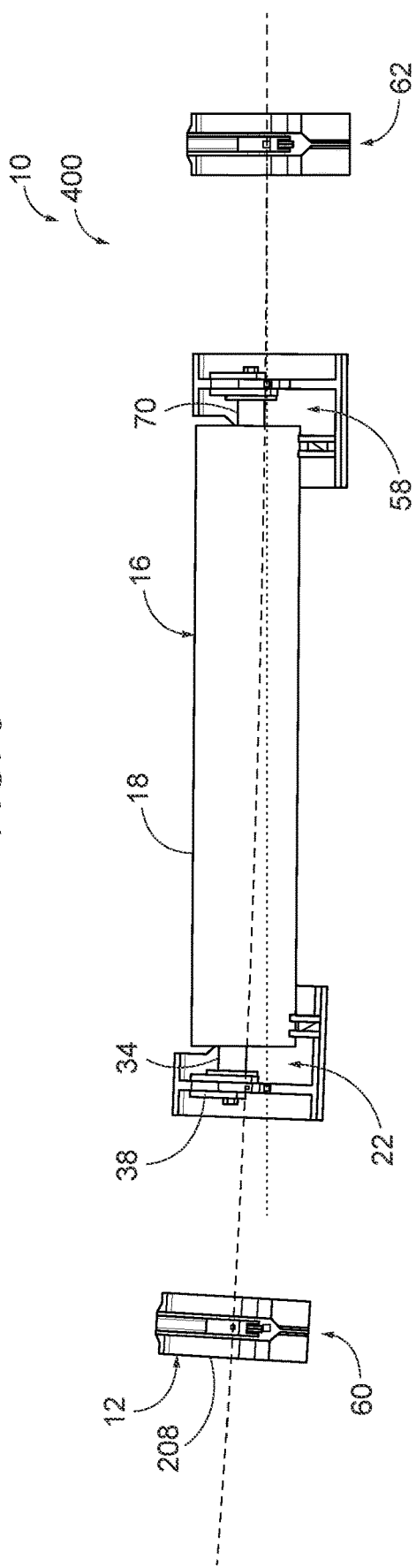
FIG. 7 is another rear view of the actuated assembly of FIG. 3 without the spoiler but showing the wing box in a deformed position.

FIG. 6 illustrates actuated assembly 400 without the spoiler 206, with the wing box 208 illustrated in a neutral position (i.e., with axes of rotation of the output gear 20 and the output shaft 34 being parallel to each other). FIG. 7 illustrates actuated assembly 400 without the spoiler 206, with the wing box 208 illustrated in a deformed position, such as resulting from the aerodynamic lift associated with the wing 210 and the weight of the fuselage 202 of an aircraft 200. In particular, in FIGS. 6 and 7, the dashed line represents the contour of the wing box 208 and the spoiler 206, and in FIG. 7, the dotted line is parallel to the axis of rotation of the output gear 20 and a longitudinal axis of the housing 18 of the rotary actuator 16. In FIG. 6, when the wing box 208 is in the neutral position, the axes of rotation of the output shaft 34 and the output gear 20 are parallel to each other, while in FIG. 7, when the wing box 208 is in a deformed positioned, the axes of rotation of the output shaft 34 and the output gear 20 are non-parallel. In particular, the housing 18 of the rotary actuator 16 remains unbent when the wing box 208 and the spoiler 206 are deformed. Accordingly, the integrity of the rotary actuator 16 is not affected by the deformation of the wing box 208 and the spoiler 206.

Figure 8:
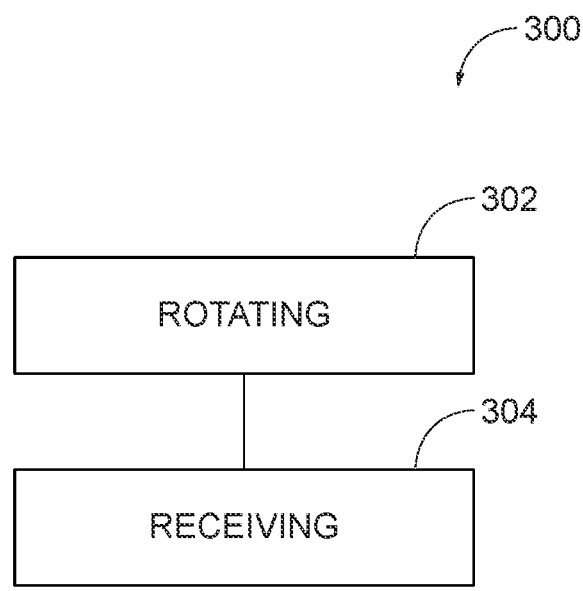
FIG. 8 is a flow chart schematically representing methods according to the present disclosure.

FIG. 8 schematically provides a flowchart that represents illustrative, non-exclusive examples of methods according to the present disclosure. The methods and steps illustrated in FIG. 6 are not limiting and other methods and steps are within the scope of the present disclosure, including methods having greater than or fewer than the number of steps illustrated, as understood from the discussions herein.

Methods 300 may be described as methods of utilizing an actuated assembly 10 according to the present disclosure to pivot an actuated object 14 relative to a base object 12. In particular, methods 300 comprise at least rotating 302 an output gear 20 about an output axis of rotation, and simultaneously with the rotating 302, receiving 304 a force that causes the base object 12 and the actuated object 14 to bend in a direction that is transverse to a longitudinal axis of a housing 18 of a rotary actuator 16. The longitudinal axis of the housing 18 of the rotary actuator 16 remains straight during the receiving 304. For example, in the context of the actuated assembly 10 being associated with a wing 210 of an aircraft 200, the force received may be the result of an upward lift experienced by the wing 210 and a weight of a fuselage 202 carried by the wing. That is, during flight, the wing 210 may bend upward. The inclusion of a joint 22 in the actuated assembly 10 isolates this upward bending of the wing 210 from the rotary actuator 16. In some examples of methods 300, the receiving 304 results in the output axis of rotation of the output gear 20 being at an angle relative to an axis of rotation of a crowned spline 24 of 0.1°-10°.

Illustrative, non-exclusive examples of inventive subject matter according to the present disclosure are described in the following enumerated paragraphs:

A. An actuated assembly (10), comprising:
a base object (12);
an actuated object (14);

a rotary actuator (16) configured to selectively pivot the actuated object (14) relative to the base object (12), wherein the rotary actuator (16) comprises:
  a housing (18) operatively coupled to the base object (12); and
  an output gear (20) configured to be selectively rotated relative to the housing (18); and
a joint (22) comprising:
  a crowned spline (24), wherein the crowned spline (24) is meshed with the output gear (20) of the rotary actuator (16), and wherein the crowned spline (24) is fixed relative to the actuated object (14); and
  a joint spherical bearing (28), wherein the joint spherical bearing (28) comprises:
    an outer race (30) fixed relative to the base object (12); and
    an inner race (32) positioned for rotational and pivotal movement within the outer race (30) and fixed relative to the crowned spline (24).

A1. The actuated assembly (10) of paragraph A, wherein the joint (22) further comprises an output shaft (34) comprising the crowned spline (24), wherein the output shaft (34) is fixed to the actuated object (14).

A1.1. The actuated assembly (10) of paragraph A1, wherein the joint (22) further comprises an axle (36) fixed to the inner race (32) of the joint spherical bearing (28); wherein the actuated object (14) comprises a yoke structure (38) comprising:
  an inner leg (40) fixedly coupled to the output shaft (34) and to the axle (36); and
  an outer leg (42) fixedly coupled to the axle (36); and
wherein the joint spherical bearing (28) is positioned between the inner leg (40) and the outer leg (42) of the yoke structure (38).

A1.1.1. The actuated assembly (10) of paragraph A1.1, wherein the joint (22) further comprises a fastener set (44) comprising the axle (36) and one or more fastening elements (46) fixing the axle (36) to the inner leg (40) and the outer leg (42) of the yoke structure (38).

A1.1.2. The actuated assembly (10) of any of paragraphs A1.1-A1.1.1, wherein the output shaft (34) comprises a flange (26), and wherein the flange (26) is fastened to the inner leg (40) of the yoke structure (38).

A1.1.2.1. The actuated assembly (10) of paragraph A1.1.2, wherein the joint (22) further comprises at least three fasteners (31) that fasten the flange (26) to the inner leg (40) of the yoke structure (38), and wherein the at least three fasteners (31) are spaced radially about the flange (26).

A1.2. The actuated assembly (10) of any of paragraphs A1-A1.1.2.1,
  wherein the joint (22) is a first joint (22) and the output shaft (34) is a first output shaft (34); and
  wherein the actuated assembly (10) further comprises a second joint (58) comprising a second output shaft (70) operatively coupled to the output gear (20), extending from the housing (18) opposite the first output shaft (34), and fixed to the actuated object (14).

A1.2.1. The actuated assembly (10) of paragraph A1.2, wherein the actuated assembly (10) further comprises:
  a third joint (60) positioned opposite the second joint (58) relative to the first joint (22), wherein the third joint (60) pivotally couples the actuated object (14) to the base object (12); and
  a fourth joint (62) positioned opposite the first joint (22) relative to the second joint (58), wherein the fourth joint (62) pivotally couples the actuated object (14) to the base object (12).

A1.2.1.1. The actuated assembly (10) of paragraph A1.2.1, wherein each of the third joint (60) and the fourth joint (62) comprises a link arm (64) coupled between the actuated object (14) and the base object (12).

A2. The actuated assembly (10) of any of paragraphs A-A1.2.1.1, further comprising one or more coupler arms (48) operatively coupled between the housing (18) of the rotary actuator (16) and the base object (12).

A2.1. The actuated assembly (10) of paragraph A2, wherein the one or more coupler arms (48) each comprise:
  a first coupler-arm spherical bearing (50) coupled to the housing (18) of the rotary actuator (16); and
  a second coupler-arm spherical bearing (52) coupled to the base object (12).

A2.2. The actuated assembly (10) of any of paragraphs A2-A2.1, wherein each of the one or more coupler arms (48) is adjustable in length.

A3. The actuated assembly (10) of any of paragraphs A-A2.2, wherein the actuated object (14) comprises a flight control surface (204).

A3.1. The actuated assembly (10) of paragraph A3, wherein the actuated object (14) comprises a spoiler (206).

A3.2. The actuated assembly (10) of any of paragraphs A3-A3.1, wherein the base object (12) comprises a wing box (208).

B. A kit (100) for assembling the actuated assembly (10) of any of paragraphs A-A3.2, wherein the kit (100) comprises two or more components of the actuated assembly (10).

C. An aircraft (200), comprising:
  a fuselage (202); and
  a wing (210) supported by the fuselage (202), wherein the wing (210) comprises the actuated assembly (10) of any of paragraphs A-A3.2.

D. The use of the actuated assembly (10) of any of paragraphs A-A3.2 to pivot the actuated object (14) relative to the base object (12).

E. A method (300) of utilizing the actuated assembly (10) of any of paragraphs A-A3.2 to pivot the actuated object (14) relative to the base object (12), wherein the housing (18) of the rotary actuator (16) defines a longitudinal axis that is parallel to an output axis of rotation of the output gear (20), the method (300) comprising:
  rotating (302) the output gear (20) about the output axis of rotation; and
  simultaneously with the rotating (302), receiving (304) a force that causes the base object (12) and the actuated object (14) to bend in a direction that is transverse to the longitudinal axis of the housing (18) of the rotary actuator (16), wherein the longitudinal axis of the housing (18) of the rotary actuator (16) remains straight during the receiving (304).

E1. The method (300) of paragraph E, wherein the receiving (304) results in the output axis of rotation of the output gear (20) being at an angle relative to an axis of rotation of the crowned spline (24) of 0.1°-10°.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An actuated assembly, comprising:
   a base object;
   an actuated object;
   a rotary actuator configured to selectively pivot the actuated object relative to the base object, wherein the rotary actuator comprises:
      a housing operatively coupled to the base object; and
      an output gear configured to be selectively rotated relative to the housing; and
   a joint comprising:
      a crowned spline, wherein the crowned spline is meshed with the output gear of the rotary actuator, and wherein the crowned spline is fixed relative to the actuated object; and
      a joint spherical bearing, wherein the joint spherical bearing comprises:
         an outer race fixed relative to the base object;
         an inner race positioned for rotational and pivotal movement within the outer race and fixed relative to the crowned spline; and
         an output shaft comprising the crowned spline, wherein the output shaft is fixed to the actuated object;
         an axle fixed to the inner race of the joint spherical bearing;
   wherein the actuated object comprises a yoke structure comprising:
      an inner leg fixedly coupled to the output shaft and the axle; and
      an outer leg fixedly coupled to the axle; and
   wherein the joint spherical bearing is positioned between the inner leg and the outer leg of the yoke structure.

2. The actuated assembly of claim 1, wherein the joint further comprises a fastener set comprising the axle and one or more fastening elements fixing the axle to the inner leg and the outer leg of the yoke structure.

3. The actuated assembly of claim 2, wherein the output shaft comprises a flange, and wherein the flange is fastened to the inner leg of the yoke structure.

4. The actuated assembly of claim 1, wherein the output shaft comprises a flange, and wherein the flange is fastened to the inner leg of the yoke structure.

5. The actuated assembly of claim 4, wherein the joint further comprises at least three fasteners that fasten the flange to the inner leg of the yoke structure, and wherein the at least three fasteners are spaced radially about the flange.

6. The actuated assembly of claim 1, wherein the actuated object comprises a flight control surface.

7. The actuated assembly of claim 6, wherein the actuated object comprises a spoiler.

8. The actuated assembly of claim 6, wherein the base object comprises a wing box.

9. An aircraft, comprising:
   a fuselage; and
   a wing supported by the fuselage, wherein the wing comprises the actuated assembly of claim 1.

10. The aircraft of claim 9, wherein the actuated object comprises a spoiler and the base object comprises a wing box.

11. A method of utilizing the actuated assembly of claim 1 to pivot the actuated object relative to the base object, wherein the housing of the rotary actuator defines a longitudinal axis that is parallel to an output axis of rotation of the output gear, the method comprising:
    rotating the output gear about the output axis of rotation; and
    simultaneously with the rotating, receiving a force that causes the base object and the actuated object to bend in a direction that is transverse to the longitudinal axis of the housing of the rotary actuator, wherein the longitudinal axis of the housing of the rotary actuator remains straight during the receiving.

12. The method of claim 11, wherein the receiving results in the output axis of rotation of the output gear being at an angle relative to an axis of rotation of the crowned spline of 0.1°-10°.

13. The actuated assembly of claim 1, wherein the crowned spline is an outer gear.

14. An actuated assembly, comprising:
   a base object;
   an actuated object;
   a rotary actuator configured to selectively pivot the actuated object relative to the base object, wherein the rotary actuator comprises:
      a housing operatively coupled to the base object; and
      an output gear configured to be selectively rotated relative to the housing;
   a first joint comprising:
      a crowned spline, wherein the crowned spline is meshed with the output gear of the rotary actuator, and wherein the crowned spline is fixed relative to the actuated object;
      a joint spherical bearing, wherein the joint spherical bearing comprises:

an outer race fixed relative to the base object; and
an inner race positioned for rotational and pivotal movement within the outer race and fixed relative to the crowned spline; and
a first output shaft comprising the crowned spline, wherein the first output shaft is fixed to the actuated object; and
a second joint comprising a second output shaft operatively coupled to the output gear, extending from the housing opposite the first output shaft and fixed to the actuated object.

15. The actuated assembly of claim 14, wherein the actuated assembly further comprises:
a third joint positioned opposite the second joint relative to the first joint, wherein the third joint pivotally couples the actuated object to the base object; and
a fourth joint positioned opposite the first joint relative to the second joint, wherein the fourth joint pivotally couples the actuated object to the base object.

16. The actuated assembly of claim 15, wherein each of the third joint and the fourth joint comprises a link arm coupled between the actuated object and the base object.

17. A method of utilizing the actuated assembly of claim 14 to pivot the actuated object relative to the base object, wherein the housing of the rotary actuator defines a longitudinal axis that is parallel to an output axis of rotation of the output gear, the method comprising:
rotating the output gear about the output axis of rotation; and
simultaneously with the rotating, receiving a force that causes the base object and the actuated object to bend in a direction transverse to the longitudinal axis of the housing of the rotary actuator, wherein the longitudinal axis of the housing of the rotary actuator remains straight during the receiving.

18. The actuated assembly of claim 14, wherein the crowned spline is an outer gear.

19. An aircraft, comprising:
a fuselage; and
a wing supported by the fuselage, wherein the wing comprises the actuated assembly of claim 14.

20. The aircraft of claim 19, wherein the actuated object comprises a spoiler, and the base object comprises a wing box.

21. An actuated assembly, comprising:
a base object;
an actuated object;
a rotary actuator configured to selectively pivot the actuated object relative to the base object, wherein the rotary actuator comprises:
a housing operatively coupled to the base object; and
an output gear configured to be selectively rotated relative to the housing; and
a joint comprising:
a crowned spline, wherein the crowned spline is meshed with the output gear of the rotary actuator, and wherein the crowned spline is fixed relative to the actuated object; and
a joint spherical bearing, wherein the joint spherical bearing comprises:
an outer race fixed relative to the base object; and
an inner race positioned for rotational and pivotal movement within the outer race and fixed relative to the crowned spline;
wherein the actuated assembly further comprising one or more coupler arms operatively coupled between the housing of the rotary actuator and the base object; and
wherein the one or more coupler arms each comprise:
a first coupler-arm spherical bearing coupled to the housing of the rotary actuator; and
a second coupler-arm spherical bearing coupled to the base object.

22. The actuated assembly of claim 21, wherein each of the one or more coupler arms is adjustable in length.

23. A method of utilizing the actuated assembly of claim 21 to pivot the actuated object relative to the base object, wherein the housing of the rotary actuator defines a longitudinal axis that is parallel to an output axis of rotation of the output gear, the method comprising:
rotating the output gear about the output axis of rotation; and
simultaneously with the rotating, receiving a force that causes the base object and the actuated object to bend in a direction transverse to the longitudinal axis of the housing of the rotary actuator, wherein the longitudinal axis of the housing of the rotary actuator remains straight during the receiving.

24. The actuated assembly of claim 21, wherein the crowned spline is an outer gear.

25. An aircraft, comprising:
a fuselage; and
a wing supported by the fuselage, wherein the wing comprises the actuated assembly of claim 21.

26. The aircraft of claim 25, wherein the actuated object comprises a spoiler, and the base object comprises a wing box.

* * * * *